June 11, 1929.  W. F. DARK ET AL  1,716,370
VEHICLE SAFETY SIGNAL
Filed Sept. 3, 1926  3 Sheets-Sheet 1
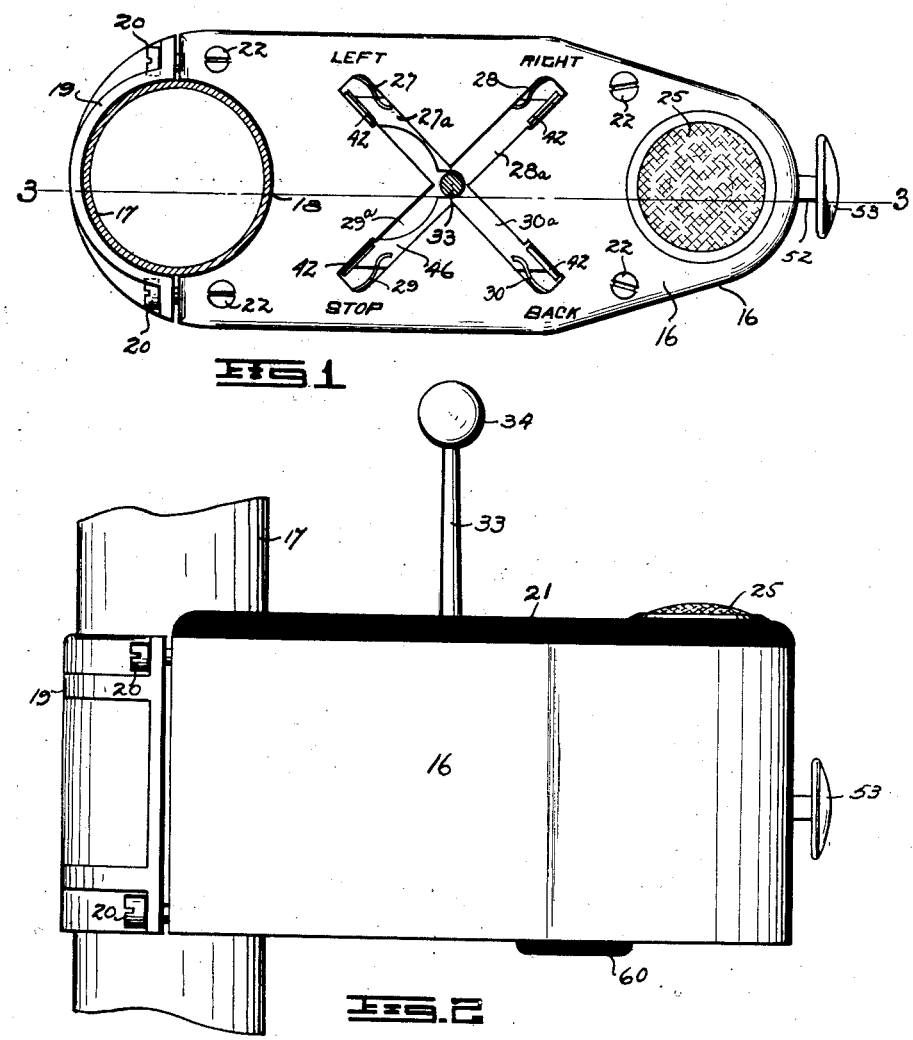
INVENTORS
W. F. Dark and
M. W. Tennant

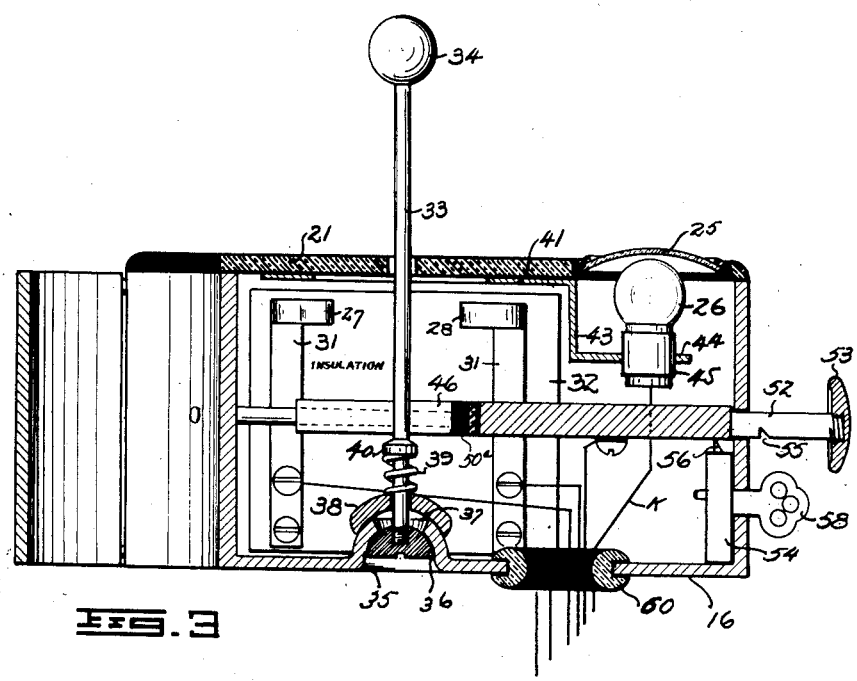
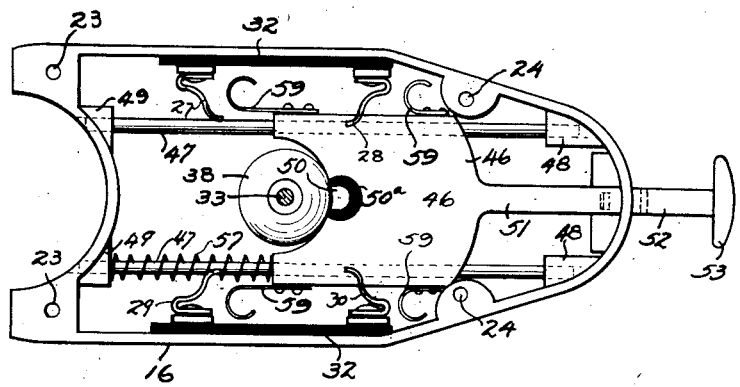

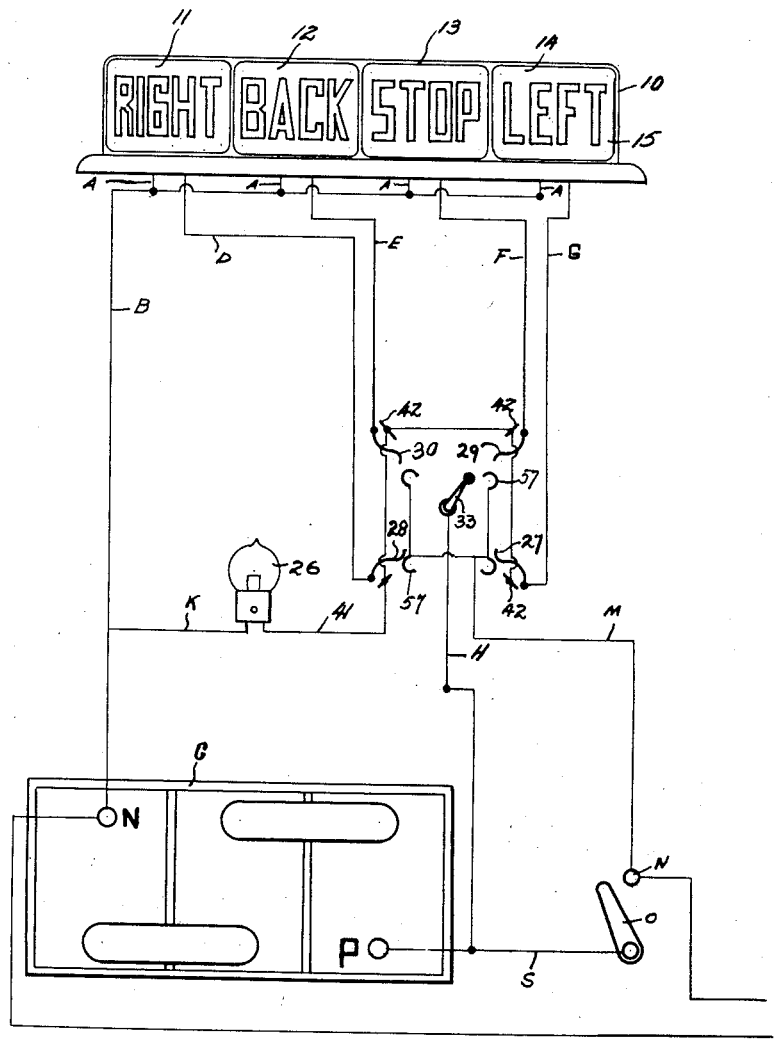

Patented June 11, 1929.

1,716,370

UNITED STATES PATENT OFFICE.

WILLIAM FREDERICK DARK AND MATHEW WILLIAM TENNANT, OF BRANDON, MANITOBA, CANADA.

VEHICLE SAFETY SIGNAL.

Application filed September 3, 1926. Serial No. 133,400.

Our invention relates to safety signals for vehicles and more particularly to that kind of signals comprising a switch box working in conjunction with exhibited, readable signals.

The main object of our invention is to provide a signal adapted to be operated in a simple manner thereby avoiding all chances of exhibiting the improper signal.

A second object consists in the provision of a signal adapted to prevent the unauthorized use or robbery of a motor car.

A further object consists in the provision of means whereby the driver of a vehicle can ascertain at all times that his signals are working properly.

Other objects as well as advantages will become apparent in the following description to which are appended drawings and in which—

Figure 1 is a top view of the signal operating switch box;

Figure 2 is a side view thereof;

Figure 3 is a sectional elevation taken on line 3—3 of Figure 1;

Figure 4 is a top view of the switch box with the cover removed to show the inside mechanism;

Figure 5 is a diagram of the signals and connections of a complete installation.

The invention comprises an arrangement of lights mounted on a suitable part of a vehicle, preferably on the top thereof. These lights are enclosed in a case of elongated form, both sides of which are made out of glass. The case is divided into as many compartments as there are lights, there being as many lights as there are signals desired. In the present case, as shown in Figure 5, 10 indicates the glass case having four compartments 11, 12, 13 and 14, each compartment having a lamp mounted therein not shown. As shown, the glass sides 15, one of which is seen, are printed with words— Right, Back, Stop and Left. It will be understood that both sides of the case will exhibit corresponding signals.

The box 16, which in the present case is shown mounted on the steering post 17, of a motor car, has a curved depression 18 at one end thereof so as to fit closely to the post. It is held rigidly thereon by a curved strap 19 on the other side of the post joined to the box by means of screws 20. In the present case, the box is cast in one piece excepting the top or cover 21 which is made of fibre or other insulating material and held in place by means of screws 22 engaging threaded apertures 23 at one end of the box and 24 in special integral lugs at the other end as shown in Figure 4. In the cover 21 is mounted a small white or colored glass 25 underneath which is mounted a small pilot lamp 26. The pilot is intended to show that the signals are working properly. The switch box serves to perform two separate functions. The first being to control the lamps at will in order to exhibit on the outside of the vehicle the desired signal; the second consists in locking the contacts in such a manner that the unauthorized operation of the vehicle may be at once detected by the exhibition of all the signals simultaneously on turning on the ignition switch or on releasing the emergency brake, or by any action of the driver which will set the switch box in circuit with the battery.

Referring to the diagram in Figure 5, it will be seen that wires A, leading to one of the two contacts of each lamp, are all connected together by wire B which leads to one of the poles of the battery C. The wires D, E, F and G each connect the second terminal of the lamps in compartments 11, 12, 13 and 14 respectively, and are each connected at their other ends to contacts 27, 28, 29 and 30 shown in the diagram and in the drawings. These contacts are fastened to connecting bars 31 mounted on both sides of the box and insulated therefrom by a piece of rubber or fibre or other suitable material 32 as shown.

A lever 33 is mounted approximately in the centre of the bottom of the box and extends through a cross-shaped opening in the cover 21 to a suitable length and terminates in a knob 34. The lower end of the lever 33 is threaded so as to receive a semispherical fibre nut 35 which rests in a semispherical depression 36 in the bottom of the box. The said depression having an opening 37 to permit the lever to pass therethrough and also to permit the same to be displaced at an angle in any direction. A curved fibre washer 38 mounted around the lever and held tightly on the upper surface of the spherical depressed part of the box by means of a spring 39 held by an integral washer 40. The washer serves to hold the lever tightly in place and also to prevent the same from being displaced by shock or vibration to which the box is subjected. This arrangement insulates the lever from the box.

The cross-shaped opening in the cover 21 forms four guideways 27ª, 28ª, 29ª and 30ª forming paths for the lever leading to the contacts 27, 28, 29 and 30 respectively. Lever 33 is connected to the other pole of the battery by means of a wire H so that when the same is connected with any one of the contacts 27, 28, 29 and 30, it will form a complete circuit from the battery through wire H, through lever 33 to one of the contacts, through one of the wires D, E, F and G, through one of the lamps to one of wires A and through wire B back to the battery.

As lamp 26 is intended to be on when any one of the signal lights is on, means to place the same in circuit are provided. These comprise a plate 41 fastened to the underside of top 21 having ears 42 bent upwardly so that there will be one of them lying on one side of each path formed by the cross-shaped opening as shown. The ears 42 are on the opposite side of the path with relation to the contacts 27, 28, 29 and 30 so that when the lever is brought in connection with any of the said contacts, it will be pressed against and connect with one of the ears 42. The plate extends downwardly as shown at 43 and also horizontally therefrom as shown at 44. In this portion indicated by 44 is mounted a lamp socket 45 holding the lamp 26. Contact is made between one pole of the lamp and socket and plate 41. The ears 42 being integral with the plate 41 are, therefore, all in connection with one pole of the lamp as shown in the diagram. The other pole of the lamp is connected by means of a wire K to the battery. The circuit is as follows: Current from the battery is led through wire K through lamp 26, then through plate 41 to lever 33 and from lever 33 back to the battery through wire H.

The locking means comprise a sliding member 46 mounted on rods 47 supported in perforations in integral lugs 48 at one end of the box and in integral lugs 49 at the other end thereof. These rods are inserted through perforations 49 and cannot be removed when the box is mounted on the steering post. Member 46 has a semi-circular portion cut out at one end, as shown, to permit free movement of lever 33. It has also a small semi-circular cutaway portion 50 straddling lever 33 when in locked position. The fibre bushing 50ª prevents contact between the member and lever 33.

In order that member 46 may be operated from the outside of the box, an integral extension 51 is provided, as shown, passing through an aperture 52 in the end of the box. The extension 51 is provided with a knob 53. The member 46 is provided with means for locking the same when holding the lever in locked position. In the present embodiment, these means consist of a small spring-lock 54 fastened to the box underneath member 46. The extension 51 is provided with a small notch 55 so positioned that when member 46 is pushed in to the limit, the penn 56 of lock 54 will engage the same thereby locking the member. A spring 57 may be mounted on one of the rods 47 as shown so that on turning a key 58, the member 46 will automatically unlock the lever.

Besides locking lever 33, member 46 also serves to place all four signals in circuit with the battery, in the present case through the ignition circuit, so that when the ignition switch is turned on, all four signals will light. This is done by mounting on each side of the member 46 small contact springs 57 so positioned that when the member is in locked position, they will connect with the bars 31 and disconnect when unlocked. The circuit thus formed is as follows: Current is supplied from one pole of the battery to the lamps as previously stated. From the lamps, the current will flow through wires D, E, F and G to the four posts 31, then by contact through springs 59 and member 46, through wire M to ignition contact N through switch O and to the other pole of the battery through wire S.

The connections and circuits described and shown in the diagram will vary, of course, to suit the vehicle or car on which the switch box is mounted. In the arrangement shown, the locking circuit only depends on the ignition switch, while the lever circuit is direct to the battery by wire H. If only the operation of both signals is to depend on the ignition switch, then member 47 may be grounded to the box and wire H dispensed with. A suitable aperture in the base provided with an insulation bushing 60 will admit the entrance of the wires to the switch box contacts from the signal case and the battery.

In operation, assuming that the car is in motion and that the driver desires to turn to the left, he will push lever 33 in path 27ª, which is marked "Left", and connect with contact 27 inside the box forming a circuit for the lamp in that part of the casing having the sign "Left". If there is electricity in the circuit, the lever will also connect with one of the ears 42 and immediately light lamp 26 assuring the driver that the desired signal is on. If the driver, after turning left, desires to stop, he can give a signal to that effect by pushing lever 33 in path 29ª resulting in the lighting of the stop signal outside the car. The same mode of operation also applies to the "right" and "back" signals. If the driver desires to leave the car, he will push knob 53 until member 46 locks. This will place all the signals in circuit as already explained so that if anyone should tamper with the car, all the signals will light on turning on the ignition switch making it publicly known that the vehicle is unlawfullly operated.

There may be more or less than four signals and therefore, a corresponding number of paths and contacts for the lever, and if desired, the pilot light 25 may be dispensed with.

While we have described and explained the operation of the embodiment shown in the drawings, it must be understood that changes and various modifications may be made to suit particular cases, and special requirements such as covered by traffic laws for different States which will be within the spirit of our invention and within the scope of the following claims.

We claim:

1. In a vehicle signal, the combination of a plurality of electrically operated visual vehicle signals, circuits therefor, selective switching means for controlling said circuits to cause the selective individual operation of the signals, circuit making and breaking means including movable contact means cooperating with the contacts of the selective switching means connected to the signals for closing all the said signal circuits, means for locking said circuit making and breaking means in closed circuit position, a third switch means operated as an incident to the starting of the vehicle, and connections between said third switch means and said movable contact means.

2. In vehicle signals, in combination with a plurality of electrically operated visible signals, a signal switch comprising a plurality of contacts and a lever means mounting the lever whereby it may be moved to contact with any individual contact, a source of current, circuit means connecting the signals, source of current, contacts and lever whereby the corresponding signal will be energized when the lever is moved into engagement with a contact, a conducting plate, means for movably mounting the plate whereby it may be moved to and from a position in which it is in engagement with all the contacts, means for locking the plate in engagement with the contacts, an ignition switch, and a conductor connecting said plate and ignition switch whereby all the signals will be energized upon the operation of the said ignition switch when the plate is in locked position.

In testimony whereof, we have hereunto affixed our signatures this 18th day of May, 1926, at the city of Brandon in the Province of Manitoba.

WILLIAM FREDERICK DARK.
MATHEW WILLIAM TENNANT.